H. A. W. SMITH.
SHEARS.
APPLICATION FILED OCT. 15, 1920.
1,390,730.
Patented Sept. 13, 1921.
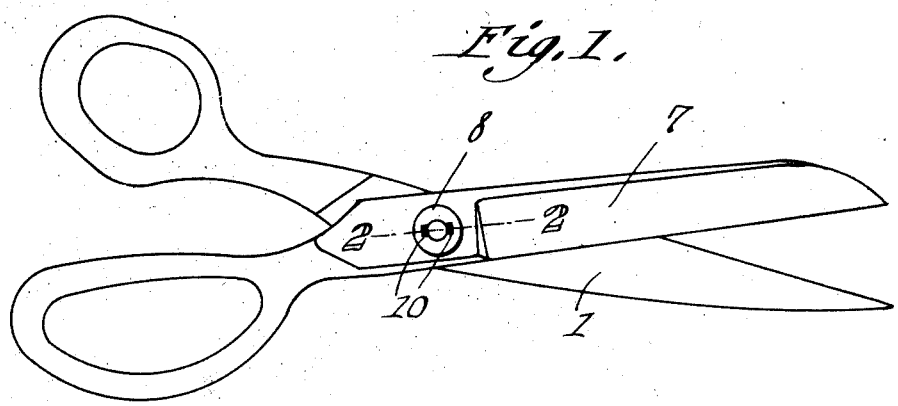
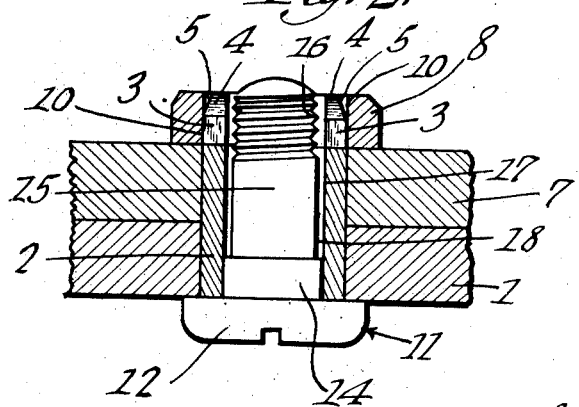
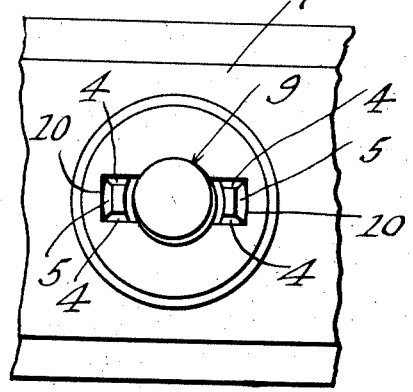
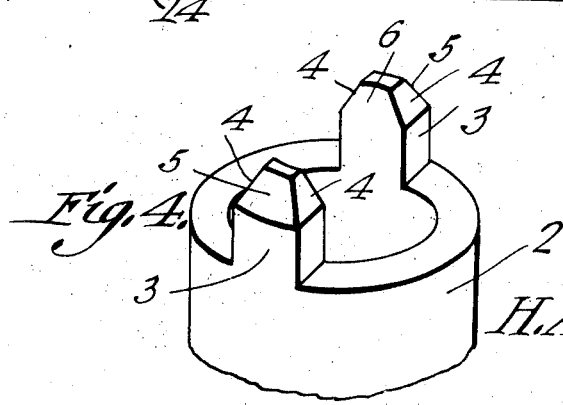
H.A.W. Smith
Inventor
By C.A. Snow & Co.
Attorneys

UNITED STATES PATENT OFFICE.

HENRY A. W. SMITH, OF CHATHAM, VIRGINIA.

SHEARS.

1,390,730.          Specification of Letters Patent.     Patented Sept. 13, 1921.

Application filed October 15, 1920. Serial No. 417,086.

*To all whom it may concern:*

Be it known that I, HENRY A. W. SMITH, a citizen of the United States, residing at Chatham, in the county of Pittsylvania and State of Virginia, have invented a new and useful Shears, of which the following is a specification.

This invention aims to improve the pivotal connection between the blades of a pair of shears and it is to be understood that, within the scope of what is claimed, a cutler may make changes in the precise structure shown, without departing from the spirit of the invention.

In the drawings:—Figure 1 shows in plan, a device embodying the invention; Fig. 2 is a section on the line 2—2 of Fig. 1; Fig. 3 is a plan showing the pivotal connection on an enlarged scale; Fig. 4 is a perspective view of the bushing.

The device includes a first blade 1 wherein a tubular bushing 2 is fixed, the bushing having fingers 3 at one end, the fingers preferably being rectangular in cross section. The fingers 3 are beveled on their side surfaces, at their ends, as shown at 4, the fingers being beveled on their outer surfaces, as shown at 5. Noting the point at which the reference numeral 6 is applied, in Fig. 4, it will be observed that the inner surfaces of the fingers 3 are not beveled at the ends of the fingers.

A second blade 7 is mounted to swing on the bushing 2. A nut 8 coöperates with the second blade 7, the nut having a bolt receiving opening 9, and being provided with seats 10, communicating with the opening 9, the fingers 3 being received in the seats 10 with a tight driving fit.

A bolt 11 is provided, the bolt comprising a head 12 coöperating with the first blade 1, a body 14 fitting tightly in the bushing 2, and a shank 15 threaded into the nut 8, as indicated at 16, the shank being of less diameter than the bore 17 of the bushing 2, as appears at 18 in Fig. 2.

In practical operation, the blade 7 is placed on the bushing 2, and the nut 8 is mounted on the fingers 3 of the bushing, the fingers being received in the seats 10 of the nut 8. Finally, the bolt 11 is inserted into the bushing 2 and is threaded into the nut 8.

Owing to the fact that the fingers 3 are beveled, as shown at 4 and 5, the fingers may have a tight driving fit in the seats 10 of the nut 8, without bending the fingers inwardly. This statement requires some explanation, since, apparently, the fingers 3 may have a tight driving fit in the seats 10, if the fingers and the seats are shaped properly in cross section, even though the fingers are of the same cross section from end to end, and are not beveled as at 4—5. Theoretically, the foregoing hypothesis is true: in practice, it has no foundation.

Recalling that the fingers 3 have a tight, driving micrometric fit in the seats 10, it is obvious that when the nut 8 is placed on the ends of the fingers, and before the nut is driven on the fingers, the fingers will not register with the seats exactly, the result being either that the fingers 3 are distorted at their ends, or that the nut 8 is distorted slightly around the edges of the seats 10. In any event, when the nut 8 is driven home on the fingers 3, the fingers at their ends, do not stand parallel, but project inwardly toward the axis of the bushing 2. When the bolt 11 is inserted into the bushing 2, the threads on the bolt come into contact with the inwardly projecting fingers, the threads are mutilated, and the hold of the nut 8 on the bolt is decreased accordingly.

All of the foregoing disadvantages are obviated if the fingers 3 are beveled as shown at 4—5, the beveled ends of the fingers being received in the seats 10, at the beginning of the driving operation, no matter how tightly the fingers fit in the seats.

Since the shank 15 of the bolt 11 has a somewhat loose fit in the bore 17 of the bushing 2, the shank may be inserted into the bushing, and may be moved about transversely, before the body 14 has been inserted into the bushing 2, the transverse movement of the bolt aiding the operator in threading the bolt into the nut 8. In other words, the operator can feel out the threads of the nut 8 with the end of the bolt—an operation which, of course, is well understood. After the bolt is threaded into the nut, the enlarged body 14 of the bolt enters the bushing 2 with a tight fit and affords a secure mounting for the bolt in the bushing. The body 14 or its equivalent constitutes means for holding the bolt tightly in the bushing 2 when the bolt is advanced completely into the bushing.

Clearly, since the fingers 3 are beveled as at 4—5, the assembling of the pivotal mounting for the blades of the shears is facilitated.

I claim:—

1. A pair of shears comprising a first blade; a tubular bushing mounted on the blade and having fingers at its end; a second blade mounted to swing on the bushing; a nut coöperating with the second blade, the nut having a bolt-receiving opening and being provided with seats communicating with the opening, the fingers being received in the seats with a tight driving fit, and being beveled at their ends thereby to avoid an inward bending of the fingers when the seats do not register exactly with the fingers during the mounting of the nut on the fingers; and a bolt comprising a head coöperating with the first blade, a body adjacent to the head and fitting tightly in the bushing, and a shank threaded into the nut and of less diameter than the body and the bore of the bushing whereby the shank may be moved transversely in the bushing to engage the nut, before the body is seated in the bushing.

2. A pair of shears comprising a first blade; a tubular bushing mounted on the blade and having fingers at its end; a second blade mounted to swing on the bushing; a nut coöperating with the second blade, the nut having a bolt-receiving opening and being provided with seats communicating with the opening, the fingers being received in the seats with a tight driving fit, and being beveled at their ends thereby to avoid an inward bending of the fingers when the seats do not register exactly with the fingers during the mounting of the nut on the fingers; a bolt comprising a head coöperating with the first blade, the bolt being movable transversely in the bushing, to engage the nut, before the bolt is inserted completely into the bushing; and means for holding the bolt tightly in the bushing, when the bolt is advanced completely into the bushing.

In testimony that I claim the foregoing as my own, I have hereto affixed my signature in the presence of two witnesses.

HENRY A. W. SMITH.

Witnesses:
 IVY E. SIMPSON,
 MASON B. LAWTON.